Oct. 15, 1957 T. H. THOMPSON 2,809,868
FUEL PUMP AND FUEL INJECTOR COMBINATION
Filed Oct. 1, 1953 4 Sheets-Sheet 2
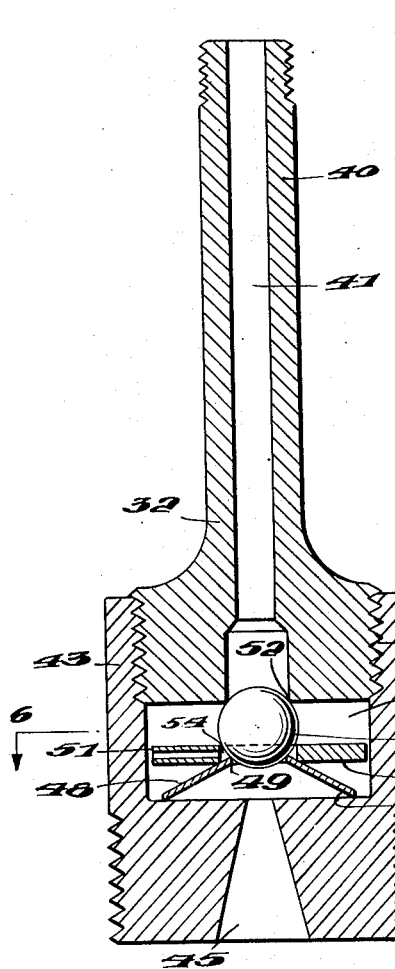
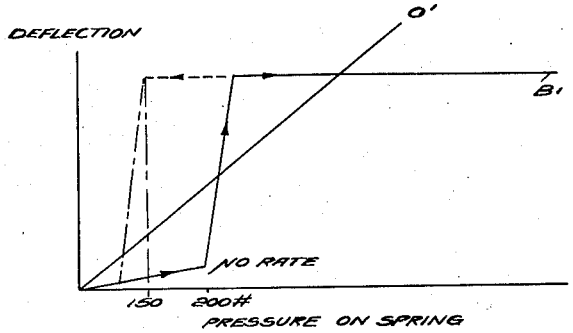
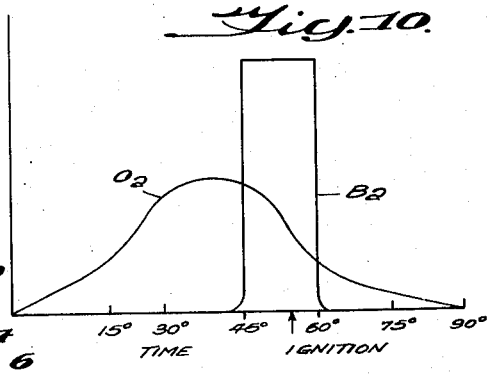
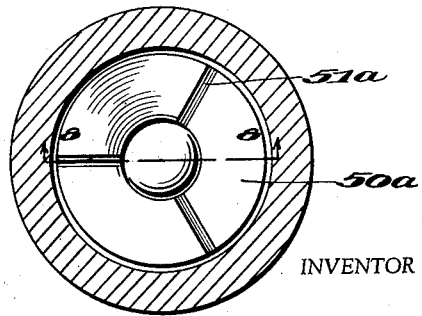
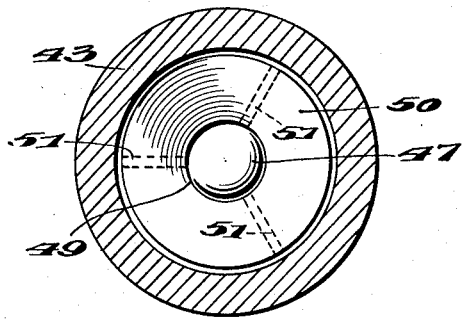
INVENTOR
TOM H. THOMPSON,
BY
ATTORNEY Oct. 15, 1957  T. H. THOMPSON  2,809,868
FUEL PUMP AND FUEL INJECTOR COMBINATION
Filed Oct. 1, 1953  4 Sheets-Sheet 3

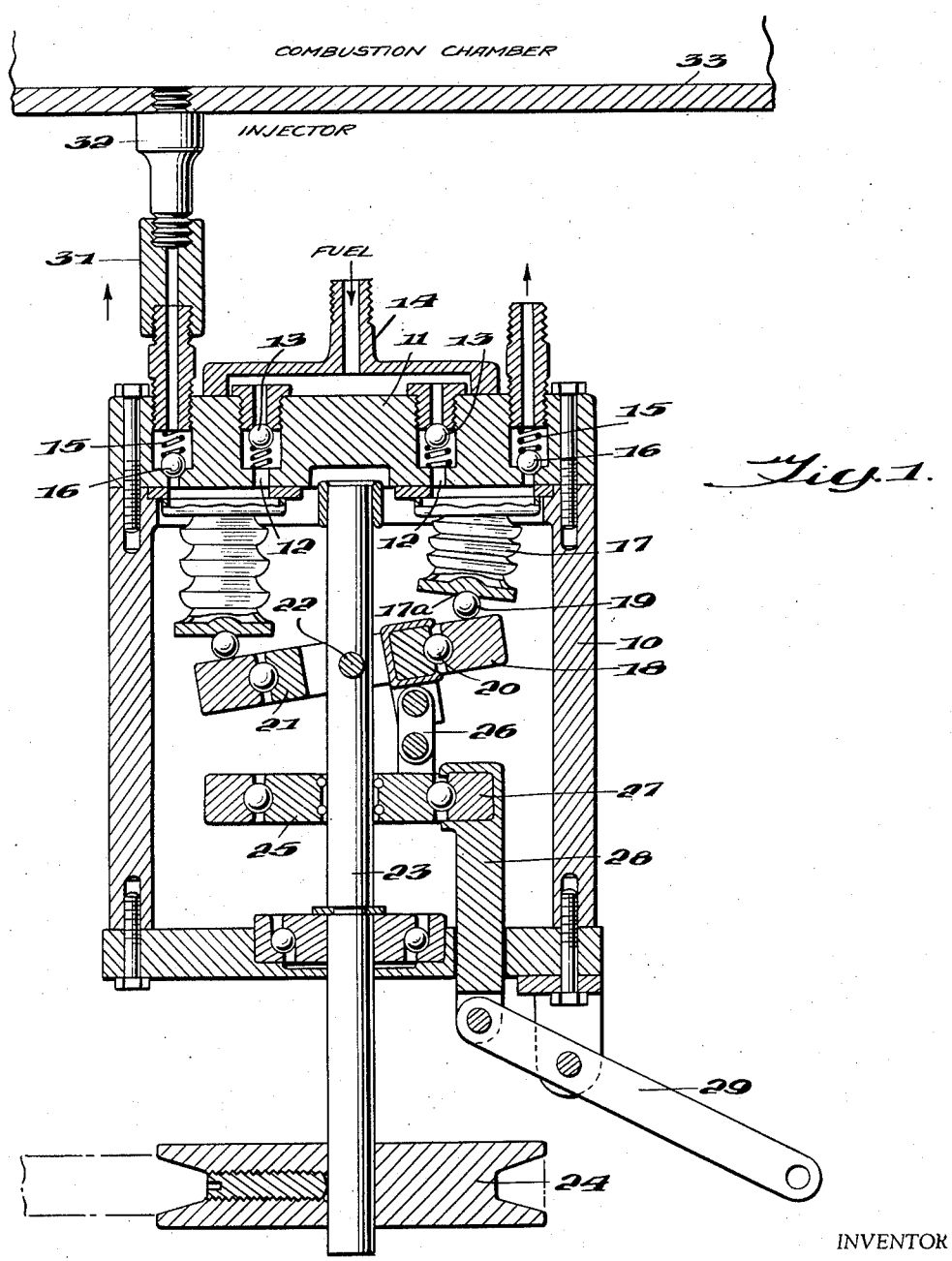

INVENTOR
TOM H. THOMPSON,
BY Robert B. Pierson
ATTORNEY

Oct. 15, 1957  T. H. THOMPSON  2,809,868
FUEL PUMP AND FUEL INJECTOR COMBINATION
Filed Oct. 1, 1953  4 Sheets-Sheet 4
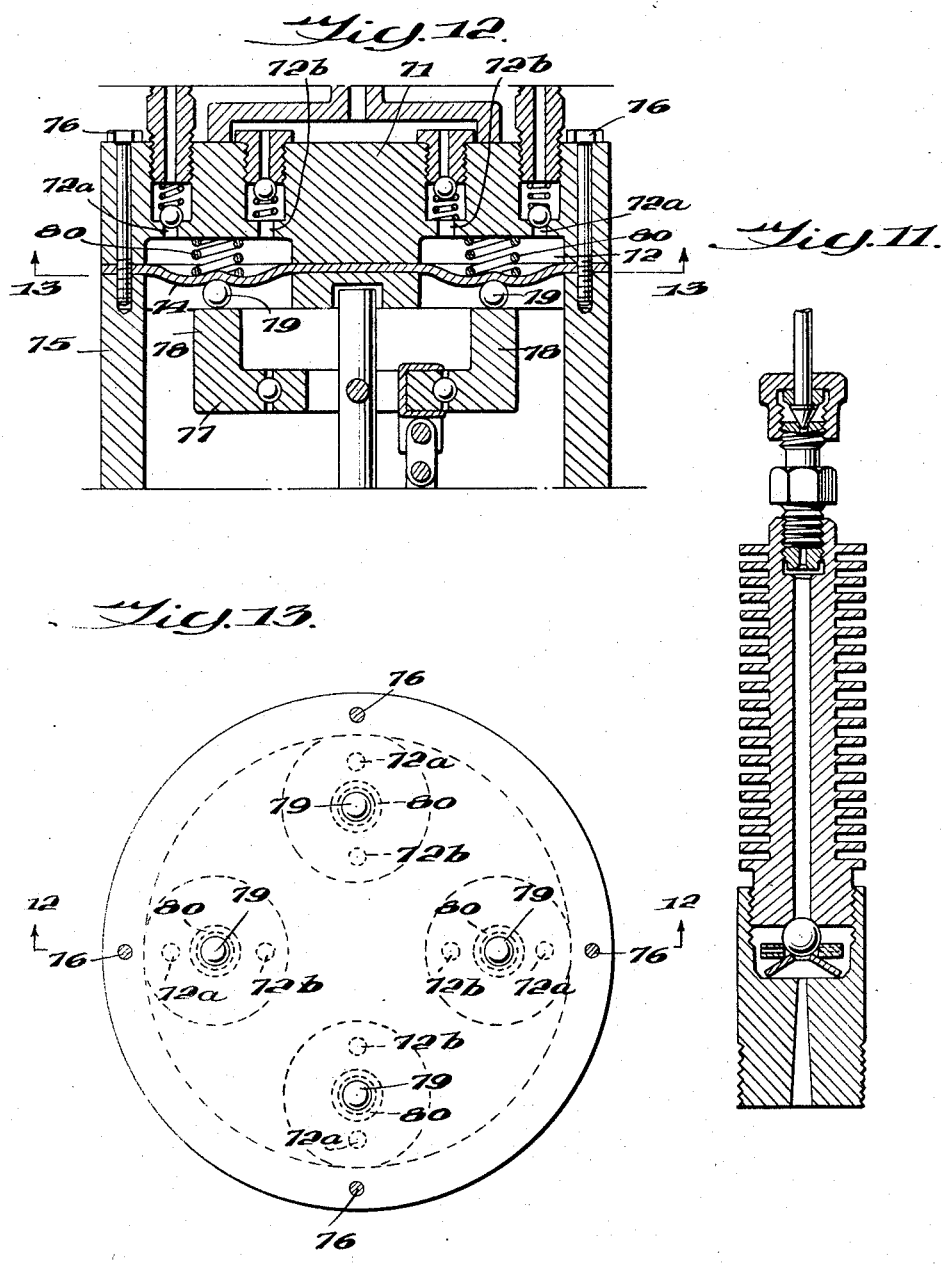
INVENTOR
TOM H. THOMPSON,
BY Robert B. Larson
ATTORNEY

United States Patent Office 2,809,868
Patented Oct. 15, 1957

2,809,868

FUEL PUMP AND FUEL INJECTOR COMBINATION

Tom H. Thompson, Holly Hill, Fla., assignor to Sabre Research Corporation, Daytona Beach, Fla., a corporation of Florida Application October 1, 1953, Serial No. 383,538

10 Claims. (Cl. 299—107.2)

This invention relates to a novel fuel pump and fuel injector combination wherein the natural "surge" or resonance tendencies of "Sylphon" type bellows used in the pump cooperate in a novel manner with a Belleville-type spring, utilizing the characteristics peculiar to such spring as it approaches its "no rate" position, thereby giving a "short spurt" discharge at high pressure from the injector. Novel features of construction are also present in both the pump and the injector individually.

It is known that "Sylphon" type bellows have certain inherent "surge" characteristics resulting from the swelling or stretching of the walls of the bellows in the elastic range during the compression strokes. This swelling or stretching provides stored energy which is released during injection. I have taken advantage of these characteristics by incorporating "Sylphon" type bellows in a fuel pump of the tilt or wobble plate type in place of the cylinder-piston arrangement customarily used in such pumps. By this construction, I am able to reduce the amount of wobble plate tilt required for full pumping action, and I am also able to combine the natural "surge" characteristics of this type bellows with novel features of construction in a new type of injector which will be described in more detail below.

Another novel feature of the pump is the use of an outer bearing race as a path for the reaction ball at the free end of the bellows, thus eliminating the connection difficulty previously accompanying the use of a wobble plate to obtain reciprocation of a component of a pump or motor. The bearing race rides on the outside of the rotating wobble plate by means of bearings and, therefore, need not partake of the rotation of this plate, thus simplifying the construction considerably.

Another novel feature of the invention is to substitute for the Sylphon bellows a single diaphragm arrangement having a plurality of compartments, each associated with a respective injection nozzle. The single diaphragm feature solves the problem of the present high cost of a Sylphon bellows, but operates in the same manner.

The novel injector is of the type in which it is desired that there be no injection until the pressure of fuel fed to the injector has built up to a certain pressure, at which time a sudden opening of the injector valve is desired in order to provide most efficient injection, followed by a quick acting closure of the valve to produce a sharp end to the injection period, preventing dribbling of fuel into the combustion chamber between injections.

The injector which I have invented makes a novel use of a Belleville-type spring, acting both as a biasing means holding the check ball of the injector valve in its closed position in the non-injecting condition, and also cooperating with the ball in this position to provide a second seal at the region of contact of the spring and ball along the periphery of the central opening in the spring. Advantage is taken of the fact that the Belleville-type spring has the characteristic of a sudden drop in its resistance to deformation as it is flattened. This characteristic not only lends basic novelty to the mode of operation of the injector, but also cooperates with the "surge" characteristic of the "Sylphon" type bellows of the pump, whereby the bellows builds up its highest pressure as the Belleville spring "gives way," that is, as the spring moves away from the ball and permits fuel injection to occur.

The injector also includes what I call a valve chamber port ring cooperating with the ball and the Belleville spring, and having radially extending openings extending between its outer and inner peripheries. This ring has an inner diameter slightly smaller than the diameter of the ball and larger than the diameter of the central opening in the Belleville spring. As pressure from the pump forces the ball from its seat, the ball first acts directly against the Belleville spring, moving it toward a flattened position, the seal of the spring against the ball causing retention of fuel in the valve bath chamber even though fuel enters the chamber by moving through the space between the ball and its valve seat proper. Injection thus has still not taken place. Then the spring moves clear of the ball, which, in its continuing movement to wide open position, contacts the port ring inner periphery and forces this ring against the Belleville spring to continue movement of the spring to its substantially flat position. Meanwhile, the fuel is free to flow radially inwardly to the center of the ring through its radial ports, and since the ball and Belleville spring are no longer in sealing contact, the fuel flows through the gap between the ball and the spring, through the central opening in the spring, and out through the injection nozzle. When the fuel pressure from the pump diminishes below the point needed to overcome the force of the Belleville spring, the spring immediately forces the ball to its closing position in contact with the valve seat, and resumes its sealing contact with the ball.

It may be found desirable to curve the bottom of the valve chamber inwardly a slight distance so that, during injection, it is impossible for the Belleville spring to go absolutely flat.

The ball, ring and spring are positioned in a valve bath chamber, which, after the initial injection, contains liquid fuel which is sealed in by the ball seated against its valve seat and against the Belleville spring. This bath is constantly renewed with each injection and prevents burning of the ball from combustion chamber heat and scale formation on the ball's seating surface. The port ring, in addition to its function explained above, assists in conditioning the ball by its motion, thereby providing an additional aid against scale, etc.

It is an object of my invention to provide the combination of a fuel pump and injector cooperating in the novel manner explained above.

A further object of the invention is to provide an injector valve having good sealing and a high speed of operation.

These and other objects of the invention will be apparent from the following specification when taken in conjunction with the accompanying drawings, in which:

Fig. 1 is a longitudinal sectional view of the novel pump, showing in somewhat diagrammatic form an injector attached thereto and feeding a combustion chamber;

Fig. 2 is a longitudinal sectional view through the injector showing the parts before the initial injection;

Fig. 6 is a sectional view taken on lines 6—6 of Fig. 2 showing the port ring;

Fig. 7 is a view similar to Fig. 6 of another embodiment of the port ring;

Fig. 8 is a sectional view taken along lines 8—8 of Fig. 7;

Figs. 9 and 10 are diagrammatic curves of spring characteristics;

Fig. 11 is a sectional view showing an alternative embodiment of the nozzle shown in Fig. 2;

Fig. 12 is a sectional view taken along lines 12—12 of Fig. 13 showing an alternative embodiment of a fuel pump; and Fig. 13 is a sectional view taken along lines 13—13 of Fig. 12.

Figure 3:
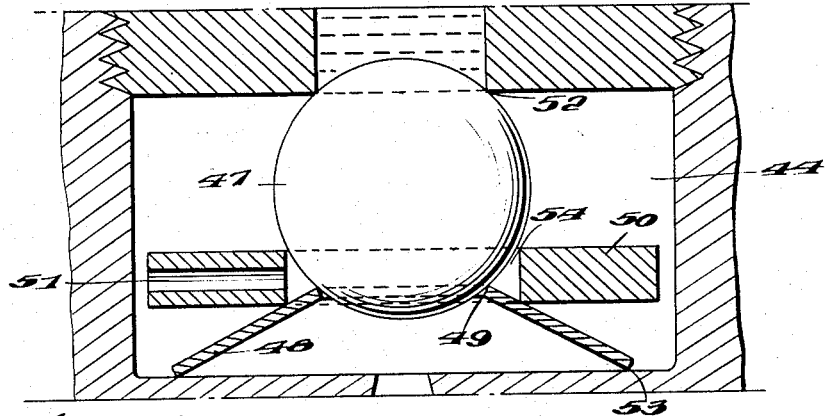
Fig. 3 is a fragmentary view similar to Fig. 2.

Referring now to Fig. 1 in greater detail, there is shown a pump casing 10, one end wall 11 of which contains inlets 12 provided with one way ball check valves 13 receiving liquid fuel from an inlet manifold 14 connected to a fuel supply (not shown). Each inlet 12 is paired with an outlet passage 15 provided with a one-way ball check valve 16. The inner ends of each pair of inlet and outlet passages communicate with a closed pumping chamber formed by one of a plurality of "Sylphon" type bellows 17.

The edges of the bellows 17 adjacent the inlets 12 and outlets 15 are fixed to the inner surface of end wall 11 by suitable means. The other or free ends of the bellows are arranged for operation by a wobble plate 21 having an outer ball bearing race 18 which transfers movement to the bellows through a suitable reaction ball arrangement 19. The connection between the bellows 17 and wobble plate 21 are designed particularly to provide smooth operation and minimum wear of the parts. Assuming that the moving parts are lubricated so as to be substantially frictionless, the race 18 would have practically no rotary movement, and it would, therefore, appear that only a pivoted link connection is required between race 18 and bellows 17. However, more careful observation has revealed that the relative movement between the lower end of the bellows 17 and race 18 describes a small figure 8 in addition to the apparent movement.

While this relative motion is not readily apparent, it would nevertheless cause repeated stressing of a link connection between the bellows and race which could ultimately cause failure from fatigue. Additionally, it would cause an undesirable vibration in the pump. To eliminate the undesirable features of this relative motion, I have employed a ball 19 connection between bellows 17 and race 18. The ball 19 is seated in a dished pocket 17a in the bellows and has an unrestrained engagement with race 18, so that the relative motion will not stress the connection nor cause vibration in the pump.

Race 18 is mounted by a suitable bearing arrangement 20 about a wobble or tilt plate 21 which is pinned at 22 to a rotatable shaft 23 adapted to be driven by a pulley wheel 24 or by any equivalent driving means such as a gear, etc.

Slidably mounted about shaft 23 is a control plate 25 which is connected by pivoted linkage means 26 to wobble plate 21. Mounted about control plate 25 is a control race 27 to which is attached a control arm 28 passing through the pump housing to an exterior connection to lever arm 29 which may be operated by any suitable control such as a throttle lever, pedal, etc.

Connected to each outlet 15 by suitable high pressure conduit 31 is the novel type of injector 32 which is shown in Figs. 2–5, and which will be described below. Only one injector is shown, although it is to be understood that each outlet 15 will be connected to an injector. The injector is shown mounted in a combustion wall 33.

One familiar with wobble plate pumps will readily understand that the lever 29 controls movement of race 27 and plate 25 to and from end wall 11. As plate 25 is moved closer to wall 11, it causes tilting of plate 21 and ring 18 to a greater extent, and as shaft 23 rotates plate 21, the wobble of the tilted plate causes pumping action of the bellows to a greater extent. When the plate 21 lies entirely in a plane perpendicular to the axis of shaft 23, no pumping action will occur as no reciprocation of the free ends of the bellows will take place.

It will be noted that ring 18 need not partake of the rotary movement of wobble plate 21, although it does partake of its wobble movement. Hence, the connection between ring 18 and bellows 17 is greatly simplified.

Turning now to the details of construction of the injector 32, reference is made to Figs. 2–5, inclusive. In these figures, the injector is shown to include an upper body 40 through which passes longitudinally a fuel channel 41. What will be called the lower end (only because the injector is so oriented in the drawings) of the body 40 is enlarged and threaded externally at 42 to receive a nozzle body 43, the cavity in which is enlarged to form a valve bath chamber 44. The lower end of body 43 has a nozzle passage 45 which aligns with passage 41, and which may be flared as shown. The body 43 is also threaded externally at 46 for mounting in the wall of a combustion chamber or the like.

Within the valve bath chamber 44 is a check ball 47 adapted to close the lower end or seat 52 of passage 41 when in its upper position shown in Fig. 2. It is urged to this position by a Belleville spring 48 having an outer periphery less than the inner diameter of chamber 44 and resting on the lower wall of the chamber. The peripheral edge of the central opening 49 of the spring engages the ball to hold it in its upper position. The machining of the spring is sufficiently fine to produce a sealing contact between the spring and the ball so that, even though fuel enters the chamber, as will be explained presently, it will not move past this seal until the proper time. By this construction, a first bath chamber is formed.

Figure 5:
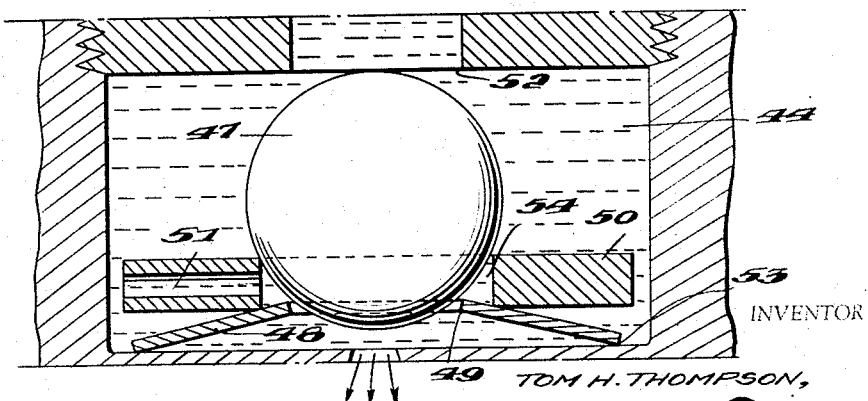
Fig. 5 is a view similar to Figs. 2 and 3, but showing the position of the parts while injection is taking place.

Also positioned in the chamber is a valve bath chamber port ring 50 having a hole 54 of an inner diameter smaller than the diameter of ball 47, but larger than the diameter of the central opening 49 in spring 48. This ring has a plurality of radial openings 51 (Fig. 5).

It will be seen that, in the position shown in Fig. 2, the edges of central opening 49 are forced by the action of spring 48 to engage ball 47, forming a seal against the passage of fluid. The outer edge of spring 48 forms another seal at 53 at the bottom of chamber 44.

Figure 4:
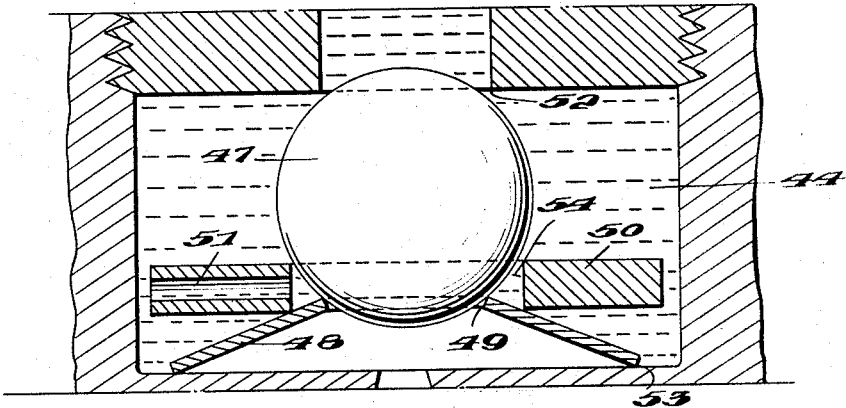
Fig. 4 is a view similar to Fig. 3 taken as pressure is initially exerted on the ball by fuel fed from the pump, but before the sealing contact between the Belleville spring and the ball is broken.

As shown in Figs. 3 and 4, as the pressure from the bellows acts on ball 47 and spring 48 to force them downwardly, the surface of ball 47 engages the upper edge of the hole 54 in port ring 50 and is forced away from its seat on central opening 49 in spring 48. Thus, a seal is formed between the surface of the ball 47 and the upper edge of hole 54. The fuel is, therefore, forced from chamber 44 through the radial openings 51 in port ring 50 and out the central opening 49 of the Belleville spring 48 and through into passage 45 to the chamber.

Figs. 2 through 5 illustrate the functions of the components of the nozzle. Fig. 2 shows the nozzle before the first bit of fuel has been injected. It is to be understood that the relationship between the fuel and the nozzle, as shown in Fig. 2, occurs probably only once during the life of the nozzle, since, during operation, chamber 44 will always have some fuel in it.

Before the first operation, however, fuel is prevented from entering chamber 44 by the engagement of ball 47 with its seat 52. The port ring 50 is maintained loosely in its position between the ball 47 and the spring 48.

As the pressure of the fuel, caused by the bellows is increased, the ball 47 moves away from its seat 52 and engages port ring 50 as explained above. Thus, fuel is admitted to chamber 44. As the pressure increases further, the action of the ball 47 on port ring 50, and the port ring 50 on spring 48, causes the spring to collapse, as shown in Fig. 4, thus, permitting the fuel to pass through the radial openings in port ring 50 and through the central opening in spring 48 into the combustion chamber.

This arrangement and cooperation of elements is very desirable from the standpoint of the elimination of carbon scale forming on the check ball 47. It can be seen that, in a valve of this type, the ball is constantly subjected to the combustion of the fuel in the combustion chamber and, until the present invention, this has been a constant source of trouble due to the burning of the ball and the forming of scale on its seating surface.

In the present injection nozzle, as explained above, the spring, in addition to its spring function, forms with the cylindrical and top walls of the nozzle a valve bath chamber 44. Thus, between injections, practically the whole surface of the ball 47 is bathed in new fuel. Additionally, the fact that the port ring between injections is unseated, that is, free to move, also provides a good ball conditioning motion to the injector assembly. Still further, during injection, it is seeen that the fuel passing through the radial openings 51 in port ring 50 blast across the only surface which has not been bathed by the fuel in chamber 44, thus augmenting the ball conditioning.

Figs. 7 and 8 show an alternative embodiment of the port ring in which the ports 51a are merely grooves cut in the lower side of port ring 50a.

One of the most important features of the present invention is the injection action resulting from the cooperation between the Sylphon bellows and the Belleville spring. The basis for this action can best be appreciated from an inspection of the curves shown in Figs. 9 and 10.

It is to be understood, of course, that the most desirable injection will occur within about 15° of the 360° pump travel. The fuel should be blasted into the combustion chamber at the beginning of injection and snapped off at the end of injection without any dribbling of the fuel into the combustion chamber at either end of the injection.

Fig. 9 shows curves of two types of spring-loaded check valves. The curve marked $O_1$ represents a valve loaded with an ordinary spring which follows Hook's law. It is seen that the deflection of the spring, which would correspond to the valve opening, is directly proportional to the pressure on the spring.

The curve indicated by $B_1$ represents a valve loaded with a Belleville spring according to the present invention. As shown by the solid line curve, it is the nature of the Belleville spring to deflect only slightly on the application of large pressures until a "no rate" position of the spring is approached. At this position, there occurs a virtual collapse of the resistance of the spring to the pressure and large deflection occurs. As the pressure is released, the spring will not snap back to its normal position until the pressure goes below the "no rate" position pressure, as illustrated by the broken line curve.

The action of the Belleville spring is combined with the surge characteristics of the Sylphon bellows. Assume, for example, that the "no rate" position of the Belleville spring will occur when the pressure on the spring is 200 pounds. As the Sylphon bellows associated with the particular spring is compressed, the liquid fuel being incompressible, causes the walls of the bellows to distend or swell. Thus, energy is stored within the walls of the bellows. The energy is continually stored as the bellows is compressed to the uppermost position of the wobble plate at about which point the pressure of the fuel begins to exceed 200 pounds. At this point, the Belleville spring will collapse and a blast of fuel will be injected into the combustion chamber.

Assuming that the spring, because of its nature, will not resume its normal position until the pressure has been decreased to at least 150 pounds, the fuel will continue to blast into the combustion chamber until the energy in the bellows is sufficiently exhausted to reduce the pressure on the fuel to 150 pounds. At this point, the spring will snap back to closed position, thereby instantaneously shutting off the flow of fuel.

Fig. 10 diagrammatically illustrates the flow of fuel where the injection valve is loaded with the Belleville spring and with the ordinary type of spring. With the ordinary spring, illustrated by the curve $O_2$, a long time before ignition, the fuel begins to dribble into the combustion chamber. After ignition, the ordinary spring slowly closes the valve and the fuel dribbles into the combustion chamber until the valve is finally closed.

Under the action of the Belleville spring, as illustrated by curve $B_2$, a short time before ignition, the fuel comes in in a blast and, at the time desired, the flow of the fuel is almost instantaneously snapped off.

It is to be understood that the representations on these curves are diagrammatic and used by way of illustration only. Variation in the timing of the ignition and the initiation and termination of the injection can be regulated as desired by proper design of the spring and timing system.

Fig. 11 shows an alternative embodiment of the injector nozzle, the principal difference over the embodiment discussed above is the use of the fin structure surrounding the major portion of the valve stem. This fin structure is particularly advantageous in cooling the nozzle which is exposed at its inner end to explosive gases because the heat from these gases is sufficient to boil the fuel in the stem immediately prior to injection.

Figs. 12 and 13 are directed to an alternative embodiment of the fuel pump. The injector nozzles and the mechanism for operating the wobble plate are the same as in the embodiment shown in Fig. 1.

The pump comprises a shell 71 formed with a plurality of fuel chambers 72, one for each injection nozzle. Each chamber is provided with inlet and outlet ports 72b, 72a.

To the bottom of the shell is fixed a single diaphragm consisting of some suitable material, for example, a sandwich of a sheet of .006 inch stainless steel, neoprene bonded to the stainless steel, and a second sheet of stainless steel enclosing the neoprene. Such a diaphragm would be conducive to a greatly prolonged life.

The diaphragm 74 is fixed to the shell 71 by the clamping member 75 together with bolts 76.

The wobble plate 77 is mounted and actuated by an arrangement similar to that shown in Fig. 1. The principal difference in the wobble plate per se is that it has been convenient to form flanges 78 on the wobble plate to extend upwardly into the holes formed by clamping member 75 to engage the ball bearings 79.

The diaphragm may be provided with springs 80 located in the chamber 72 to urge the diaphragm toward an extended position.

The wobble plate acts against the force of spring 80 to force the fuel into the injection nozzle as previously described.

Spring 80 can be any suitable type such as the Belleville spring or the helical spring illustrated.

The diaphragm can conveniently be formed with a recess on the lower side thereof to seat ball 79 and a recessed groove on the upper side thereof to seat the spring 80.

It is obvious that a pump constructed according to Fig. 12 will be considerably less expensive to build and also considerably less subject to failure than the pump of Fig. 1.

While I have described what I deem to be the most practical and efficient embodiments of my invention, it is to be understood that I do not wish to be limited thereto, except within the scope of the accompanying claims.

I claim:

1. A liquid injection nozzle for use with a pump capable of delivering fuel at greater than datum pressure comprising, means forming a chamber having an inlet port and an outlet port, a valve member engageable with said inlet port to close said inlet port, a Belleville spring having substantially a no-rate characteristic at greater than datum pressure and disposed in said chamber and normally urging said valve member into engagement with said inlet port, said Belleville spring being disposed between said inlet and outlet ports, and means including an aperture in said Belleville spring forming a communication between said inlet port and said outlet port when said valve member is out of engagement with said inlet port.

2. A liquid injection nozzle comprising, a chamber consisting of a cylindrical wall and first and second transverse walls having respectively an inlet port and an outlet port, a valve member disposed in said chamber and normally engageable with said inlet port to close said inlet port, a Belleville spring having its larger edge engaging the transverse wall surrounding said outlet port and its smaller edge engaging said valve member to urge it to closed position, said spring forming a valve bath chamber with the marginal portion of said second wall, the cylindrical wall and said first wall, and means including an aperture in said Belleville spring forming a communication between said inlet port and said outlet port.

3. A nozzle according to claim 2 in which said last-named means comprises a ring located between said valve member and said spring, and means forming passageways in said ring for the flow of liquid radially inwardly to the center opening of said ring, said ring being of sufficient dimensions to force said valve member away from the smaller edge of said spring as said spring is compressed.

4. A nozzle according to claim 2 in which said last-named means comprises means for forcing the smaller edge of said spring out of engagement with said valve member when said spring is compressed.

5. A liquid injection nozzle comprising, a chamber consisting of a cylindrical wall, an inlet wall transverse to said cylindrical wall and having an inlet port therein, an outlet wall parallel to and spaced from said inlet wall and having an outlet port therein, a spherical valve member engageable with said inlet port to close said inlet port, a Belleville spring having its larger edge engaging said outlet wall surrounding said outlet port and having its smaller edge engaging said valve member to urge it into closed position, and a port ring disposed between said spring and said valve member and having a central opening of smaller diameter than the diameter of said valve member, said port ring having radially outwardly extending passageway means for the flow of liquid from said inlet port, through said passageway means, through the central hole in said Belleville spring, and out said outlet port.

6. In combination, a fuel pump comprising a plurality of pumping chambers having inlets and outlets, resilient expansion and compression means associated with chambers for the intaking and expelling of fuel, and a fuel injection nozzle including a chamber having inlet and outlet ports associated with each of said pumping chambers, said nozzles each being controlled by a Belleville spring biased valve in which said spring has substantially a no-rate characteristic, said Belleville spring biased valve being disposed between said inlet and outlet ports and having an aperture therein for the passage of fuel, said resilient means having the capacity to store energy during the compression thereof immediately prior to injection, which energy is released at the collapse of said spring and utilized to force fuel through said nozzle.

7. In combination, a fuel pump comprising a plurality of pumping chambers having inlets and outlets controlled by check valves, a plurality of collapsible bellows means communicating with said chambers and arranged in a circular disposition, a wobble plate cooperating with said bellows means for causing compression and expansion of said bellows means with movement of said wobble plate, a rotatable plate support located coaxially within and cooperating with said wobble plate to impart tilting movement to said wobble plate while rotating relative to the bellows, means for rotating said plate support, and means controlling the degree of tilt of said plate support, and fuel injector means receiving fuel from an outlet of said pump on compression of the bellows means associated therewith, said fuel injector comprising body means having an internal chamber and a fuel inlet passage opening into said chamber through a valve seat and a fuel outlet passage located opposite said valve seat, a valve ball within said chamber and of a size sufficient to close inlet passage when in engagement with the valve seat, a Belleville spring in said chamber and normally in a position wherein its outer periphery rests on the chamber wall surrounding the fuel outlet and the periphery of the central opening therein is in contact with the ball in sealing relation and holds the ball in sealing relation against the valve seat, and a washer of a smaller outer diameter and larger inner diameter than said spring and whose inner diameter is smaller than the outer diameter of the ball, said washer having radial openings therein providing communication between its inner and outer peripheries, said washer being positioned normally with its opening surrounding the region of contact of said spring and the ball when the ball is in its seated position on the valve seat, the ball being movable from said seat in response to increased pressure in the inlet passage of the injector to move the central portion of said spring axially while maintaining the sealing relation of the ball and said spring until said spring approaches a no rate position in which its resistance to the pressure exerted by the ball decreases substantially, whereupon the ball continues its movement away from the valve seat, now exerting force on said washer by engagement with the inner periphery of the washer and continuing to exert force on said spring through the interposed washer, the axial openings in the washer meanwhile permitting fluid flow around the valve, through the opening in said spring and out through the outlet of the injector.

8. A liquid injection nozzle for use with a pump capable of delivering fuel at greater than datum pressure comprising, means forming a chamber having an inlet port and an outlet port, a valve member engageable with said inlet port to close said inlet port, spring means having a substantially no-rate characteristic at greater than datum pressure, said spring means being disposed in said chamber between said inlet and outlet ports and normally urging said valve member into engagement with said inlet port, and means including an aperture in said spring means forming a passageway between said inlet port and said outlet port when said valve member is out of engagement with said inlet port.

9. A fuel pump comprising, a shell forming a plurality of chambers having inlet and outlet ports at one end thereof, a disc-like diaphragm terminating said chambers at their other ends, means forming a leak-tight seal with said diaphragm and shell around each chamber, means for actuating said diaphragm for intake and expulsion of fuel, a helical compression spring located between said diaphragm and port end in said chamber, and a ball-bearing associated with each chamber forming the connection between said diaphragm and said actuating means, said diaphragm being shaped to form depressions on either side thereof to seat said spring and ball bearing.

10. A fuel pump comprising, a shell forming a plurality of chambers having inlet and outlet ports at one end thereof, a disc-like diaphragm terminating said chambers at their other ends, means forming a leak-tight seal with said diaphragm and shell around each chamber, means for actuating said diaphragm for intake and expulsion of fuel, a Belleville spring located between said diaphragm and port end in said chamber, and a ball bearing associated with each chamber forming the connection between said diapragm and said actuating means, said diaphragm being shaped to form depressions on either side thereof to seat said spring and ball bearing.

References Cited in the file of this patent

UNITED STATES PATENTS 1,117,779    Bulmer             Nov. 17, 1914

(Other references on following page)

UNITED STATES PATENTS

| | | |
|---|---|---|
| 1,208,616 | Mong | Dec. 12, 1916 |
| 1,893,457 | Tartrais | Jan. 3, 1933 |
| 1,904,799 | Palmer | Apr. 18, 1933 |
| 2,052,737 | Zubaty | Sept. 1, 1936 |
| 2,192,803 | Purdy | Mar. 5, 1940 |
| 2,264,914 | Orange | Dec. 2, 1941 |
| 2,324,524 | Mercier | July 20, 1943 |
| 2,392,279 | Woods | Jan. 1, 1946 |
| 2,713,858 | Armstrong et al. | July 26, 1955 |

FOREIGN PATENTS

| | | |
|---|---|---|
| 945,304 | France | Nov. 22, 1948 |
| 815,588 | Germany | Oct. 4, 1951 |